US006074756A

United States Patent [19]

Vreeland et al.

[11] Patent Number: 6,074,756

[45] Date of Patent: *Jun. 13, 2000

[54] TRANSFER MEMBER FOR ELECTROSTATOGRAPHY

[75] Inventors: William B. Vreeland, Webster; David E. Hockey, Brockport, both of N.Y.

[73] Assignee: Eastman Kodak Company, Rochester, N.Y.

[ * ] Notice: This patent is subject to a terminal disclaimer.

[21] Appl. No.: 08/845,300

[22] Filed: Apr. 25, 1997

[51] Int. Cl.$^7$ .......... B23B 27/00

[52] U.S. Cl. .......... 428/423.1; 430/47; 399/297; 399/306

[58] Field of Search .......... 428/423.1; 436/47; 399/297, 306

[56] References Cited

U.S. PATENT DOCUMENTS

| | | | |
|---|---|---|---|
| 3,702,482 | 11/1972 | Dolcimascolo et al. . | |
| 3,781,105 | 12/1973 | Meagher . | |
| 4,522,866 | 6/1985 | Nishikawa et al. | 428/216 |
| 4,729,925 | 3/1988 | Chen et al. . | |
| 5,084,735 | 1/1992 | Rimai et al. | 430/106.6 |
| 5,132,739 | 7/1992 | Mauer et al. . | |
| 5,337,129 | 8/1994 | Badesha . | |
| 5,340,679 | 8/1994 | Badesha et al. | 430/126 |
| 5,456,987 | 10/1995 | Badesha . | |
| 5,480,938 | 1/1996 | Badesha . | |
| 5,523,830 | 6/1996 | Tamura et al. . | |
| 5,534,983 | 7/1996 | Kubo . | |
| 5,563,695 | 10/1996 | Sakurai et al. . | |
| 5,576,818 | 11/1996 | Badesha et al. | 355/271 |
| 5,623,330 | 4/1997 | Ishibashi | 399/310 |
| 5,728,496 | 3/1998 | Rimai et al. | 430/47 |

FOREIGN PATENT DOCUMENTS

| | | |
|---|---|---|
| 0 617 345 A1 | 9/1994 | European Pat. Off. . |
| 0 747 785 A2 | 12/1996 | European Pat. Off. . |
| 0 784 245 A2 | 7/1997 | European Pat. Off. . |

*Primary Examiner*—Mark Chapman
*Attorney, Agent, or Firm*—John R. Everett; Doreen M. Wells

[57] ABSTRACT

In accordance with the invention, a toner transfer member for electrostatography comprises a substrate and an outer surface layer comprising a material selected from the group consisting of a ceramer comprising a polyurethane silicate hybrid organic-inorganic network and a fluoropolymeric composition comprising a polyester-based polyurethane and polytetrafluoroethylene. The transfer member of the present invention is particularly useful for duplex electrostatographic copying processes; its outer surface layer substantially reduces the migration of release oil from the fusing station to the photoconductor via the transfer member, thereby ensuring high quality fused images on both sides of a receiver sheet.

29 Claims, No Drawings

TRANSFER MEMBER FOR ELECTROSTATOGRAPHY

CROSS-REFERENCE TO RELATED APPLICATION

Reference is made to U.S patent application Ser. No. 08/846,056 concurrently filed, commonly assigned application ELECTROSTATOGRAPHIC INTERMEDIATE TRANSFER MEMBER HAVING A CERAMER-CONTAINING SURFACE LAYER, by M. C. Ezenyilimba et al., the disclosure of which is incorporated herein by reference.

FIELD OF THE INVENTION

This invention relates generally to the field of electrostatography. More particularly, the invention relates to electrically biased transfer members that are especially useful in electrostatographic duplex transfer processes. A transfer member of the invention includes a surface layer whose characteristics are effective to diminish contamination of the photoconductor by toner fuser release agents.

BACKGROUND OF THE INVENTION

In electrostatography, an image comprising an electrostatic field pattern, typically of non-uniform strength, which is usually referred to as an electrostatic latent image, is formed on an insulative surface of an electrostatographic element by any of various methods. For example, the electrostatic latent image may be formed electrophotographically, i.e., by imagewise photo-induced dissipation of the strength of portions of an initially uniform electrostatic field of uniform previously formed on a surface of an electrophotographic element comprising a photoconductive layer and an electrically conductive substrate. It may also be formed by dielectric recording, i.e., by direct electrical formation of an electrostatic field pattern on a surface of a dielectric material. Typically, the electrostatic latent image is then developed into a toner image by contacting the latent image with a developer composition containing charged toner particles. If desired, the toner image can be transferred to a final support material or receiver such as a web or sheet of paper and affixed thereto by, for example, thermal fusing at a fusing station that typically includes two rollers, at least one of which is heated. A permanent record of the original is thereby formed.

The transfer of toner images between supporting surfaces has been accomplished using either a transfer roller or belt electrode biased to a certain potential, or a coratron. In corona-induced transfer as disclosed, for example, in U.S. Pat. No. 2,836,725, the disclosure of which is incorporated herein by reference, the final support sheet is placed in direct contact with the toner image while the image is supported on the photoconductive surface. The back of the sheet, that is, the side away from the image, is subjected to a corona discharge having a polarity opposite to that carried by the toner particle, thereby causing the toner to be electrostatically transferred to the sheet. In the corotron system, electrostatically deposited charges tack a final support such as, for example, paper to the original toner support, for example, the photoconductor, at the same time creating the electrical field required to effect transfer of the toner to the paper. However, the strong attraction between the paper and the original toner support makes it mechanically difficult to separate the two supports.

A biased transfer member, for example, a roller or drum, electrically cooperates with a conductive support surface to attract electrically charged particles from the support surface towards the transfer member. Transfer of developed images from the photoconductor to the final support using a biased transfer member is well known in the art. In U.S. Pat. No. 2,807,233, the disclosure of which is incorporated herein by reference, a metal roller coated with a resilient coating having a resistivity of at least $10^6$ ohm-cm is used as a bias transfer member. Because of the high resistivity of the coating, the amount of bias that can be applied to the roller is limited to relatively low operating voltages. At higher voltages, the air in or about the transfer zone begins to ionize, causing the image to be degraded during transfer. In U.S. Pat. No. 3,520,604, the disclosure of which is incorporated herein by reference, is described a transfer roller made of a conductive rubber and having a resistivity in the range of $10^{16}$ to $10^{11}$ ohm-cm. Here, in order to give the roller the resiliency required for most applications, the coating must be relatively thick. The resulting high resistivity would be expected to cause charge to build up on the surface of the roller, resulting in air ionization in the transfer region and eventual copy degradation.

Other biased transfer members have been disclosed that purport to overcome many of the electrical and image degradation problems associated with some of the previous transfer techniques. U.S. Pat. No. 3,702,482, for example, the disclosure of which is incorporated herein by reference, describes a transfer member having an outer coating with electrical resistivity intended to minimize ionization of the surrounding atmosphere when the transfer member is placed in electrical cooperation with a conductive support surface. In U.S. Pat. No. 3,781,105, the disclosure of which is incorporated herein by reference, is described a similar transfer member employed in conjunction with variable electrical bias means to regulate automatically the electrical field levels at various points on the transfer member during the transfer operation, with the object of providing constant current control.

In duplex electrophotographic processing, in which a fused toner image is formed on both sides of a receiver sheet, release oil is applied at the fusing station to the first imaged side of the receiver sheet. When the sheet is turned over for imaging of the reverse side, the oiled first side comes in contact with the transfer member. A portion of the oil from the first side can adhere to the surface of the transfer member and from there be transferred to the photoconductor in an interframe area between receiver sheets. Toner particles that accumulate on the oil-contaminated area of the photoconductor can be transferred to subsequent imaged receiver sheets, resulting in high background density and degraded images.

The application of release oil at the fusing station can be effected by various means such as a roller, a pad, a wick, and the like. Clearly, it is desirable that toner fuser release oil be delivered during copying at a controlled, substantially constant rate. This desirable steady state of oil delivery can, however, be disrupted by various events such as, for example, installation of a new pad or wick or occurrence of a rest period between copying runs. Such events can lead to excess oil being delivered to the fusing station before equilibrium is reestablished, which aggravates the problem of oil contamination of the photoconductor. This problem is substantially mitigated by the toner transfer member of the present invention.

SUMMARY OF THE INVENTION

In accordance with the invention, a toner transfer member for electrostatography comprises a substrate and an outer surface layer comprising a material selected from the group consisting of a ceramer comprising a polyurethane silicate hybrid organic-inorganic network and a fluoropolymeric composition comprising a polyester-based polyurethane and polyterrafluoroethylene. The transfer member of the present invention is particularly useful for duplex electrostatographic copying processes; its outer surface layer substantially reduces the migration of toner release oil from the fusing station to the photoconductor via the transfer member, thereby ensuring high quality fused images on both sides of a receiver sheet.

DETAILED DESCRIPTION OF THE INVENTION

A transfer member of the present invention is preferably a roller comprising a substrate having a metallic core and a resilient, electrically conductive elastomeric blanket layer, on which is formed a thin outer surface layer having low permeability by toner fuser release oils. The thickness of the outer surface layer is preferably about 1$\mu$ to 20$\mu$, more preferably, about 2$\mu$ to 12$\mu$. Under operating conditions, optimal image transfer is achieved by maintaining a relatively constant current flow in the range of about 30–70$\mu$ amps in the nip area between the transfer roll surface, receiver,and photoconductive surface from which a developed image is to be transferred. The resilient elastomeric material comprising the blanket layer has a volume resistivity preferably within the range from about $10^7$ ohm-cm up to about $10^{11}$ ohm-cm.

A suitably constructed electrostatographic apparatus is capable of duplex copying, whereby images are fused on each side of a receiver sheet using a separate pass through the fusing station for each side of the receiver. To prevent toner fuser release agent from contaminating an image member by passage from a first image side of a duplex copy to a transfer drum and thence to the image member, the present invention provides for a surface layer to be applied to the transfer roller. One approach to release oil management in duplex copying is described in U.S. Pat. No. 5,132,739, the disclosure of which is incorporated herein by reference, which discloses a process algorithm for preventing or lessening the application of release oil during fusing of the first side of duplex copies. A similar approach is described in U.S. Pat. No. 5,563,695, the disclosure of which is incorporated herein by reference. U.S. Pat. No. 5,523,830, the disclosure of which is incorporated herein by reference, describes a method for removing fusing oil from a transfer material support member, and U.S. Pat. No. 5,534,983, the disclosure of which is incorporated herein by reference, describes the use of a non-woven cloth to clean fuser oil from a photoconductor.

The present invention describes transfer roller overcoat materials having properties effective to substantially prevent fuser oil from migrating to the photoconductor from the fuser member via the transfer member, particularly when operating in the duplex processing mode. This photoconductor contamination problem is encountered when nominal rates for toner fuser oil application to the fuser roller are excessive, or during periods when oil application exceeds the nominal rate. Transitory periods for excessive oil delivery commonly occur after installation of a new wick or after long periods of idle time of the electrophotographic machine. An imaging defect is arises when a run of several hundred to several thousand duplex prints are run using a relatively small receiver such as 8.5"×11" paper. Release oil is applied at the fusing station to a roller that contacts the first side of the receiver sheet to be imaged, creating a high level of residual oil on that side of the sheet during the simplex pass. The sheet is turned over by one of several common mechanisms such that the other side of the receiver sheet is presented to the imaged photoconductor for the duplex transfer. The side of the receiver that was oiled at the fusing station during the first pass now comes in contact with the transfer member, and a portion of the oil contained on the receiver sheet is conveyed to the transfer member. The oil on the transfer member can then pass to the photoconductor in the interframe area between receiver sheets. The image defect becomes apparent when a subsequent job is run using a larger receiver sheet, for example, 11"×17" paper. The fuser oil that accumulated in the previous interframe area attracts toner from the toning apparatus, resulting in a band of toner on the 11"×17" receiver in the area where the larger sheet overlaps the previous interframe.

The problem just described is solved by the transfer member of the present invention, which comprises a surface member, thereby preventing or diminishing the migration of fuser oil from an oiled duplex copy to the photoconductor. Breaking the cycle in this manner prevents oil from building up in the interframe area. The subsequent exposure to toner does not result in the tenacious adherence of toner to the photoconductor surface, which consequently can be readily cleaned by the cleaning subsystem of the electrophotographic apparatus.

The term "ceramer" is formed by merging the words "ceramic" and "polymer." Ceramers have been accepted by Chemical Abstracts Service (CAS) for monomer-based polymer registration (June 1994, Vol. 121). Ceramers are described in CAS *Change in Indexing Policy for Siloxanes* (1/95) as "hybrid organic-inorganic networks prepared by hydrolytic polymerization (sol-gel process) of tetraalkoxysilanes with alkoxysilane-containing organic moieties, which may be trialkoxysilyl-terminated organic polymers." In the present invention, this description is applicable to the ceramers comprising the surface layer of the intermediate transfer member, wherein the alkoxysilane comprises an alkoxysilyl-terminated polyurethane. An intermediate transfer member having a blanket member overcoated with a thin layer of a thermoplastic, a sol-gel, or, preferably, a ceramer, is described in co-pending, commonly assigned U.S. patent application Ser. No. 08/653,518, filed May 24, 1996 by Rimai et al. now U.S. Pat. No. 5,728,496, ELECTROSTATOGRAPHIC APPARATUS AND METHOD FOR IMPROVED TRANSFER OF SMALL PARTICLES, the disclosure of which is incorporated herein by reference.

In one embodiment of the present invention, a transfer member for electrostatography comprises a substrate and an outer surface layer comprising a ceramer that is a polyurethane silicate hybrid organic-inorganic network. The substrate is preferably a roller having a blanket layer formed of a thermoplastic polyurethane, and the ceramer of the outer surface layer preferably comprises the reaction product of a polyurethane having terminal reactive alkoxysilane moieties with a tetrasiloxysilane compound.

In a preferred embodiment of the invention, the polyurethane with terminal alkoxysilane groups is the reaction product of one or more aliphatic polyols having terminal hydroxyl groups and an alkoxysilane-substituted alkyl isocyanate compound. Suitable aliphatic polyols have molecular weights of about 60 to 8000 and may be polymeric. Polymeric aliphatic polyols may further include a plurality of functional moieties selected from the group consisting of an ester, an ether, a urethane, a non-terminal hydroxyl, and combinations thereof. Polymeric polyols containing ether functions are preferably polytetramethylene glycols having number-average molecular weights from about 200 to 6500, which can be obtained from various commercial source. For example, Terathane™ –2900, –2000, –1000, and –650 polytetramethylene glycols having the indicated number-average molecular weights are available from DuPont.

Polymeric polyols containing a plurality of urethane and ether groups are obtained by reaction of polyethylene glycols with alkylene diisocyanate compounds containing about 4 to 16 aliphatic carbon atoms, for example, 1,4-diisocyanatobutane, 1,6-diisocyanatohexane, 1,12-diisocyanatododecane, and, preferably, isophorone diisocyanate (5-isocyanato-1-(isocyanatomethyl)-1,3,3-trimethylcyclohexane). The reaction mixture may further include monomeric diols and triols containing 3 to about 16 carbon atoms; the triol compounds provide non-terminal hydroxyl substituents that provide crosslinking of the polyurethane. In a preferred embodiment of the invention, a polymeric polyol is formed from a mixture of isophorone diisocyanate, a polytetramethylene glycol having a number-average molecular weight of about 2900, 1,4-butanediol, and trimethylolpropane in a molar ratio of about 8:3:5:1.

Reaction of the aliphatic, preferably polymeric, polyol having terminal hydroxyl groups with an alkoxysilane-substituted alkyl isocyanate compound, which may be promoted by a condensation catalyst, for example, an organotin compound such as dibutyltin dilaurate, provides a polyurethane having terminal reactive alkoxysilane moieties, which undergoes further reaction, preferably acid-catalyzed, with a tetraalkoxysilane compound to provide a ceramer useful for the surface layer of the transfer member of the present invention. The molar ratio of aliphatic polyol:alkoxysilane-substituted alkyl isocyanate is preferably about 4:1 to about 1:4, more preferably about 2:1 to about 1:2.

The aliphatic hydroxyl-terminated polyols employed in the preparation of the ceramer of the invention are of the general formula $$HO—R^1—OH$$

and have molecular weights of about 60 to 8000. As previously noted, at least one polyol is preferably polymeric, and $R^1$ may include a plurality of ester, ether, urethane, and non-terminal hydroxyl groups.

The alkoxysilane-substituted alkyl isocyanate compound preferably has the formula $$OCN—R^2—Si(OR^3)Z^1Z^2$$

where $R^2$ is an alkylene group containing about 2 to 8 carbon atoms, $OR^3$ is an alkoxy group containing 1 to about 6 carbon atoms, and $Z^1$ and $Z^2$ are moieties independently selected from the group consisting of alkoxy containing 1 to about 6 carbon atoms, hydrogen, halo, and hydroxy. More preferably, $R^2$ contains 2 to about 4 carbon atoms, and $OR^3$, $Z^1$, and $Z^2$ are each alkoxy groups containing 1 to about 4 carbon atoms. An especially preferred alkoxysilane-substituted alkyl isocyanate compound is 3-isocyanatopropyl-triethoxysilane.

The tetraalkoxysilane compound is preferably selected from the group consisting of tetrabutyl orthosilicate, tetrapropyl orthosilicate, and, more preferably, tetraethyl orthosilicate.

The hybrid organic-inorganic network of the ceramer comprising the outer surface layer of the transfer member of the invention has the general structure

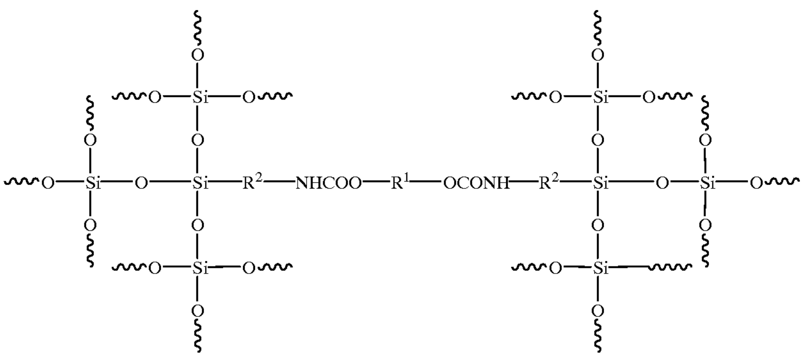

where $R^1$ and $R^2$ are as previously defined . The hybrid organic-inorganic network includes about 10 to 80 weight percent, more preferably about 25 to 65 weight percent, and most preferably about 35 to 50 weight percent silicon oxide.

In another embodiment of the present invention, the outer surface layer of the transfer member comprises a fluoropolymeric composition comprising a polyester-based polyurethane and polytetrafluoroethylene (PTFE). The fluoropolymeric composition comprises preferably about 30 to 95 weight percent polyester-based polyurethane and about 5 to 70 weight percent PTFE. More preferably, the fluoropolymeric composition comprises about 40 to 80 weight percent of polyester-polyurethane and about 20 to 60 weight percent PTFE. The fluoropolymeric composition optionally includes up to about 15 weight percent of a pigment, preferably selected from the group consisting of calcium carbonate, titanium dioxide, and a phthalocyanine pigment. Materials useful for the formation of the outer surface layer of a transfer member of the present invention include, for example, fluoropolymeric compositions sold under the tradename Xylan™ by Whitford Corporation, West Chester Pa.

The following examples further illustrate the invention:

Example 1

Preparation of Polvurethane Ceramer

To a one- liter three-neck round bottom flask under nitrogen and containing 300 g dry tetrahydrofuran (THF) under nitrogen was added 100.0 g (0.0345 mole) Terathane™ 2900 polytetramethylene glycol, 4.94 g (0.0549 mole), 1,4-butanediol, and 1.52 g (0.0113 mole) trimethylolpropane. The mixture was stirred under nitrogen until a solution was obtained; then 19.72 g (0.0887 mole) isophorone diisocyanate were added, and the mixture was degassed under reduced pressure (0.10 mmHg). 0.0127 g (0.0187 mmole) dibutyltin dilaurate was added, and the mixture was heated at 60° C. under nitrogen for 5.5 hr. To the above solution was added 9.93 g (0.0401 mole) 3-isocyanatopropyl-triethoxysilane and 130.0 g dry THF. The mixture was heated 60° C. for 15 hr, yielding a solution containing 24.0 weight percent dissolved solids.

To 64.7 ml of the above solution in a 500 ml plastic beaker was added 60 ml isopropyl alcohol and 51.4 ml tetraethyl orthosilicate. After stirring of the resulting solution at room temperature for several minutes,18 ml of 0.15N hydrochloric acid was added. The solution was stirred at room temperature for 48 hr, after which 0.5 g Silwet™ 7002 was added. The resulting solution was stirred for 15 min and allowed to stand for 15 min longer, then ring coated onto a prepared polyurethane roller, as described in Example 2.

Syntheses of other polyurethane silicate ceramers useful for the present invention are described in the previously mentioned patent application, ELECTROSTATOGRAPHIC INTERMEDIATE TRANSFER MEMBER HAVING A CERAMER-CONTAINING SURFACE LAYER, by M. C. Ezenyilimba et al., the disclosure of which is incorporated herein by reference.

The transfer member of the invention comprises a substrate that is preferably a polyurethane roller. Such rollers can be made from various commercially available polyurethane two-component mixes or from combinations of various commercially available pre-polymer resins, chain extending agents, antistatic agents, and cross-linking agents. Examples of commercially available polyurethane two-component mixes include Conathane™ TU-400, TU-500, and TU-900, available from Conap Inc., Olean N.Y., or D2146, a polyether based polyurethane, obtainable from Winfield Industries, Buffalo N.Y. Examples of commercially available pre-polymer resins include Adiprene™ L100 and L42 and Vibrathane™ 8011, all available from Uniroyal. Examples of commercially available chain extenders include Ethacure™ 100 and 300, available from Ethyl Corporation, and 1,4-butanediol. Examples of commercially available crosslinking agents include Voranol™ 234–630 from Dow Chemical, LHT-28 from ARCO Chemical,and trimethylolpropane.

Procedures for the preparation of substrates for transfer rollers are described in, for example, U.S. Pat. Nos. 5,212,032; 5,541,001; 5,554,474; 5,156,915; 5,217,838; and 5,250,357, the disclosures of which are incorporated herein by reference.

Example 2

Preparation of Transfer Rollers

A transfer roller substrate having a metallic core and a blanket layer formed from D2181, a polyether based polyurethane, was obtained from Winfield Industries, Buffalo N.Y. The volume resistivity of the blanket layer had been adjusted to $1.0 \times 10^9$ ohm-cm by incorporating into the D2181 formulation a polyol charge-control agent, as described in U.S. Pat. No. 4,729,925, the disclosure of which is incorporated herein by reference. Following post cure, the mold and casting were cooled to room temperature, after which the casting was removed from the mold. The surface of the roller substrate, which had an outside diameter of about 1 inch, was then ground to provide a uniform, slightly matte surface having a roughness value, $R_a$, of about 30 microinches. The surface roughness measurement was carried out on a 5-inch long roller using a Federal Surfanalyzer 4000 Profilometer provided with a transverse chisel stylus moving at a speed of 2.5 mm/sec. The dimensions and other characteristics of the conductive roller are, of course, dictated by the design of the copy equipment into which it is to be incorporated.

A 10 $\mu$-thick overcoat layer of the ceramer prepared as described in Example 1 was applied to the transfer roller substrate using a ring coating process. The overcoat was allowed to air dry for 1.5 hr at room temperature. The overcoated roller substrate was placed into an oven and ramped to a temperature of 80° C. over a period of 1 hr. The transfer roller was held at 80° C. for 24 hr, then cooled to room temperature.

A second transfer roller having a 10 $\mu$-thick surface layer of Xylan™ 1237 White in place of the ceramer overcoat was also prepared. Xylan™ 1237 White is a pigmented water-dispersible composition containing a polyester-based polyurethane and polytetrafluoroethylene and is available from the Whitford Corporation, West Chester Pa. In-house analysis of this material by infrared and atomic absorption spectroscopy showed it to have the following approximate composition: 48–55 weight percent polyester-polyurethane, 32–39 weight percent polytetrafluoroethylene, and 7–10 weight percent calcium carbonate.

The second transfer roller was prepared by the following procedure: Xylan™ 1237 White as received from Whitford was ground in a ball mill for 4 hr at room temperature. A primer solution was prepared using A0700 [N-(2-aminoethyl)-3-aminopropyltrimethoxysilane], available from United Chemical Technologies, Inc. 10 g of the silane compound was added to 10 g methanol; to this was added 2g distilled water. The solution was stirred at room temperature for 30 min; 75 g of methyl ethyl ketone was added, and the resulting solution was stirred at room temperature in a stoppered flask for 15 min. The primer was then applied to a D2146 transfer roller substrate prepared as described above, using a ring coating process. The primed substrate was air dried for 30 min at room temperature, cured at 80° C. for 1 hr, and cooled to room temperature. To a magnetically stirred 250 ml round bottom flask containing 100 g of the ball mill-ground Xylan™ 1237 White was added 35.8 g distilled water. The solution was stirred at room temperature for 2 hr. The primed transfer roller substrate was then overcoated with the diluted Xylan™ 1237 White solution using the ring coating method. Immediately after overcoating, the roller was placed in an upright position in an oven at 80° C. for 1 hr, then removed and cooled to room temperature.

Example 3

Measurement of Oil Spread Rates

The ceramer and Xylan™ 1237 White formulations used in the preparation of the transfer rollers described in Example 2 were each hand coated on an Estar™ sheet. The resulting coated sheets were allowed to air dry at ambient temperature for 1 hr, then cured at 80° C. for 24 hr.

Measurements of oil spread rates on the just described coatings and on a slab of the polyether-polyurethane D2181 used for the transfer roller substrates were made, using a Rame-Hart Model 100-00-115 Goniometer. Changes in contact angle as a function of time were determined for the D2181 slab (as a control) and the ceramer and Xylan™ 1237 White coatings, using water, diiodomethane, and a toner release oil comprising Dow Corning DC 200 silicone oil (viscosity 60,000 centistokes) containing 2% Silwet™ 7002. In performing the tests, an area of each sample surface was washed with distilled water without wiping, then allowed to air dry before application of a drop of the test liquid. The results of these measurements are summarized in TABLE 1 below.

TABLE 1

| | Contact Angle (degrees) | | | | | | | | | | | |
|---|---|---|---|---|---|---|---|---|---|---|---|---|
| | $H_2O$ | | | | $CH_2I_2$ | | | | Release Oil | | | |
| Sample | 1' | 2' | 5' | Δ | 1' | 2' | 5' | Δ | 1' | 2' | 5' | Δ |
| 1-1 D2181 (Control) | 84 | 84 | 84 | 0 | 66 | 66 | 66 | 0 | 70 | 56 | 40 | 30 |
| 1-2 Ceramer Overcoat (Invention) | 97 | 97 | 97 | 0 | 66 | 66 | 66 | 0 | 63 | 56 | 44 | 19 |
| 1-3 Xylan ™ 1237 Overcoat (Invention) | 60 | 60 | 60 | 0 | 40 | 39 | 35 | 5 | 61 | 56 | 40 | 21 |

The values of Δ in TABLE 1, which are the changes in contact angle measurements at 1 minute and at 5 minutes, represent spread rates observed for drops of the three liquids applied to each of the sample surfaces. Little if any spread was observed for $H_2O$ or $CH_2I_2$. For the silicone toner release oil, however, control sample 1—1 showed substantial oil spread, as indicated by the high Δ value of 30 degrees. For samples 1-2 and 1-3, overcoated with ceramer and Xylan™ 1237 White, respectively, the spread was substantially reduced, as reflected in the considerably lower Δ values of 19 and 21 degrees, respectively. These results demonstrate the improved release oil repellency imparted to the substrate surface by an overcoat of the materials employed in the outer surface layer of a transfer member of the invention.

Example 4

Evaluation of Toner Release Oil Artifacts Using Various Transfer Rollers

To evaluate possible causes of toner fuser release oil artifacts, a test procedure was developed by running an L-12 orthogonal array on a high volume copier equipped with a rotating wick for applying release oil at the fusing station. It was found that the most significant factor influencing experimental variability was the consistency of oil delivery by the wicking system in the fuser. It was also observed that toned areas transferred less oil to the transfer roller than bare paper.

With respect to oil delivery from the wick, the two largest factors influencing the delivery were found to be wick age and rest/run effects. Very high oil rates were observed when a new wick was installed. This was found to be due to the amount of oil that was loaded into the wick during the manufacturing process. The mass of the oil loaded when the wick was made was higher than the steady state oil mass delivery condition attained by the wick during machine running. It was also observed that the wick delivered high oil rates after a rest period. Because the wick has a fairly long time constant for oil pumped into the wick to migrate to the wick surface, the high oil delivery after rest was followed by a low oil delivery period until the wick could again reach steady state.

The experimental procedure that follows was developed to account for the effects of oil delivery on image quality.

1. At the beginning of each test setup, observe the condition of the fuser wick. If significant toner contamination is on the surface of the wick, replace the wick. A minimum of 8K simplex sheets must be run prior to any oil artifact testing to bring the wick down to its steady state oil delivery condition.

2. Run 1K simplex sheets (8.5"×11" 20# bond paper) with a low coverage image (<6%) to eliminate the rest/run oil delivery transient. During this run, check to see that the oil pump is functioning correctly. If this is the first run of the day, a 1.5K simplex run is made.

3. A 2K sheet (4K image) duplex run on 8.5"×11" 20# bond paper is made to contaminate the interframe area with oil. The image run during this contamination run is 0.250" intrack bars separated by 0.740. This contamination run must be started within 10 minutes of completing step 2 to assure steady state oil delivery.

4. Shift the photoconductor alignment 3"so that all 8.5"×11" interframe areas will be visible on 11"×17" paper. Run 12–11"×17" simplex sheets with no image to evaluate for oil artifacts.

5. Run 11"×17" simplex sheets until no background is observed in the previous interframe areas. Run an additional 250–11"×17" sheets to condition the interframes for the next contamination run.

6. Return the photoconductor alignment to the normal position.

7. Repeat steps 1–6 for the next test condition.

To quantify the performance of various transfer rollers, RMSGS background measurements were made in the interframe areas. The RMSGS measurements, which yield weighted values corresponding to area coverage of background toner particles, were carried out using an image analyzer and algorithms similar to those described in Edinger, "The Image Analyzer—A Tool for the Evaluation of Electrophotographic Text Quality" in *Journal of Imaging Science*, 1987, Vol. 31, No. 4, pp 177–183, and Edinger, "Color Background in Electrophotographic Prints and Copies" in *Journal of Imaging Science and Technology*, 1992, Vol. 36, No. 3 pp 249ff, the disclosures of which are incorporated herein by reference.

The standard test run comprised 4000 (4K) images, i.e., 2000 (2K) duplex processed receiver sheets. A "stress" test, which was employed with the transfer rollers of the invention, comprised runs of 10K or 20K images. In addition, these stress tests included a newly installed wick, a condition that aggravates release oil and toner contamination of the photoconductor.

Test results are summarized in TABLE 2 below. Transfer rollers employed in the tests included, in addition to the overcoated rollers of the invention (tests 2–4 and 2–5), the following controls: a standard ground D2181 substrate having a roughness value, $R_a$, of about 30 microinches (2–1) a smooth (as cast) unground D2181 roller (2—2); and a coarsely ground D2181 roller having a surface roughness average, $R^a$, of about 300 microinches.

TABLE 2

| Test | Transfer Roller | Test Condition | RMSGS | ΔRMSGS |
|---|---|---|---|---|
| 2-1 Control | D2181 Substrate | 4K Images | 2.41 | — |
| 2-2 Control | Smooth (As Cast) D2181 | 4K Images | 1.88 | 0.53 |
| 2-3 Control | Rough D2181 | 4K Imaqes | 4.10 | −1.69 |
| 2-4 Invention | Ceramer Overcoat | 20K Images, New Wick | 1.56 | 0.85 |
| 2-5 Invention | Xylan ™ 1237 Overcoat | 10K Images, New Wick | 1.65 | 0.76 |

As shown by the data in TABLE 2, control test 2-1, employing a standard ground D2181 substrate as the transfer roller, gave an RMSGS value of 2.41. Substitution of the smooth,as cast, D2181 roller in control test 2—2, gave an RMSGS improvement, i.e., decrease, of 0.53. The roller with a rougher surface employed in control test 2–3, on the other hand, gave a much worse result, a 1.69 increase in the RMSGS value.

Test 2-4, in which a transfer roller of the invention having a ceramer overcoat was employed, gave a greatly improved RMSGS value of 1.56, a decrease of 0.85 from the control test 2-1 measurement, in spite of its being carried out for a greatly extended run using a new wick. Similarly, test 2-5, using a Xylan™ 1237 White-overcoated substrate in accordance with the invention, also resulted in a substantially improved RMSGS value of 1.65 under stress conditions.

The results in TABLE 2 strikingly demonstrate the advantage of the present invention in reducing image artifacts caused by toner fuser release oil and toner contamination of the photoconductor during duplex processing.

The invention has been described in detail with particular reference to preferred embodiments thereof, but it will be understood that variations and modifications can be effected within the spirit and scope of the invention.

What is claimed is:

1. A transfer member for electrostatography comprising:

a substrate; and an outer surface layer comprising a material selected from the group consisting of:

a ceramer, said ceramer comprising a polyurethane silicate hybrid organic-inorganic network; and a fluoropolymeric composition comprising a polyester-based polyurethane and tetrafluoroethylene.

2. The transfer member of claim 1 wherein said ceramer comprises the reaction product of a polyurethane having terminal reactive alkoxysilane groups with a tetraalkoxysilane compound.

3. The transfer member of claim 2 wherein said polyurethane having terminal alkoxysilane groups comprises the reaction product of one or more aliphatic polyols having terminal hydroxyl groups and an alkoxysilane-substituted alkyl isocyanate compound.

4. The transfer member of claim 3 wherein said aliphatic polyols have molecular weights of about 60 to 8000.

5. The transfer member of claim 3 wherein at least one of said aliphatic polyols is a polymer.

6. The transfer member of claim 5 wherein said polymeric aliphatic polyol further includes a plurality of functional moieties selected from the group consisting of an ester, an ether, a urethane, a non-terminal hydroxyl, and combinations thereof.

7. The transfer member of claim 6 wherein said polymeric aliphatic polyol comprises a polytetramethylene glycol.

8. The transfer member of claim 7 wherein said polytetramethylene glycol has a number-average molecular weight of about 200 to 6500.

9. The transfer member of claim 6 wherein said polymeric aliphatic polyol comprises a reaction product of a mixture comprising a polytetramethylene glycol and an alkylene diisocyanate compound containing about 4 to 16 aliphatic carbon atoms.

10. The transfer member of claim 9 wherein said mixture further comprises a monomeric aliphatic diol and a monomeric aliphatic triol, each containing 3 to about 16 carbon atoms.

11. The transfer member of claim 10 wherein said polytetramethylene glycol has a number-average molecular weight of about 2900, said monomeric aliphatic diol is 1,4-butanediol, said monomeric aliphatic triol is trimethylolpropane, and said alkylene diisocyanate compound is isophorone diisocyanate.

12. The transfer member of claim 11 wherein the molar ratio of isophorone diisocyanate:polytetramethylene glycol:1,4-butanediol:trimethylolpropane is about 8:3:5:1.

13. The transfer member of claim 3 wherein the molar ratio of said aliphatic polyol:alkoxysilane-substituted alkyl isocyanate compound is about 4:1 to about 1:4.

14. The transfer member of claim 13 wherein the molar ratio of said aliphatic polyol:alkoxysilane-substituted alkyl isocyanate compound is about 2:1 to about 1:2.

15. The transfer member of claim 3 wherein said alkoxysilane-substituted alkyl isocyanate compound has the formula $$OCN—R^2—Si(OR^3)Z^1Z^2$$

wherein $R^2$ is an alkylene group containing 2 to about 8 carbon atoms, $OR^3$ is an alkoxy group containing 1 to about 6 carbon atoms, and $Z^1$ and $Z^2$ are moieties independently selected from the group consisting of alkoxy containing 1 to about 6 carbon atoms, hydrogen, halo, and hydroxyl.

16. The transfer member of claim 15 wherein $R^2$ is an alkylene group containing 2 to about 4 carbon atoms, and $OR^3$, $Z^1$, and $Z^2$ are each alkoxy groups containing 1 to about 4 carbon atoms.

17. The transfer member of claim 16 wherein said tetraalkoxysilane compound is selected from the group consisting of tetraethyl orthosilicate, tetrapropyl orthosilicate, and tetrabutyl orthosilicate.

18. The transfer member of claim 17 wherein said alkoxysilane-substituted alkyl isocyanate compound is 3-isocyanatopropyl-triethoxysilane and said tetraalkoxysilane compound is tetraethyl orthosilicate.

19. The transfer member of claim 1 wherein said ceramer has a silicon oxide network comprising about 10 to 80 weight percent of said ceramer.

20. The transfer member of claim 19 wherein said silicon oxide network comprises about 25 to 65 weight percent of said ceramer.

21. The transfer member of claim 20 wherein said silicon oxide network comprises about 35 to 50 weight percent of said ceramer.

22. The transfer member of claim 1 wherein said fluoropolymeric composition comprises about 30 to 95 weight percent polyester-based polyurethane and about 5 to 70 weight percent tetrafluoroethylene.

23. The transfer member of claim 22 wherein said fluoropolymeric composition comprises about 40 to 80 weight percent polyester-based polyurethane and about 20 to 60 weight percent tetrafluoroethylene.

24. The transfer member of claim 23 wherein said fluoropolymeric composition further comprises up to about 15 weight percent of a pigment.

25. The transfer member of claim 24 wherein said pigment is selected from the group consisting of calcium carbonate, titanium dioxide, and a phthalocyanine pigment.

26. The transfer member of claim 1 wherein said outer surface layer has a thickness of about 1$\mu$ to 20$\mu$.

27. The transfer member of claim 26 wherein said outer surface layer has a thickness of about 2$\mu$ to 12$\mu$.

28. The transfer member of claim 1 wherein said substrate is an electrically conductive roller comprising a metallic core and a blanket layer comprising a thermoplastic polyurethane.

29. The transfer member of claim 1 adapted for use in duplex copying.

* * * * *

UNITED STATES PATENT AND TRADEMARK OFFICE

CERTIFICATE OF CORRECTION

PATENT NO. : 6,074,756

DATED : June 13, 2000

INVENTOR(S) : Zhao, et. al.

It is certified that error appears in the above-identified patent and that said Letters Patent is hereby corrected as shown below:

On page 2 of the title page, under Related U.S. application data, lines 4, 5: "which is a continuation-in-part of applicaiton no. 08/729,822, Oct. 8, 1996, Pat. No. 5,837,164" should be deleted as it is a duplicate entry.

On the title page under Other Publications, Col. 2, line 19, after "B.", insert --K.--.

Column 1, lines 8, 9, "which is a continuation-in-part of Ser. No. 08/729,822, now U.S. Patent No. 5,837,164" should be deleted as it is a duplicate entry.

Column 3, line 31, "10-4" should be --$10^{-4}$--.

Column 3, line 50, "withstand" should be --withstanding--.

Column 4, line 18, claim 30, "25" should be --24--.

Column 4, line 46, "Ts" should be --$T_s$--.

Column 9, line 25, "MP:" should be --Mp:--.

Column 11, line 5, "MΩ" should be "mΩ".

Signed and Sealed this

Twenty-second Day of May, 2001

*Attest:*

Nicholas P. Godici

NICHOLAS P. GODICI

*Attesting Officer* *Acting Director of the United States Patent and Trademark Office*

UNITED STATES PATENT AND TRADEMARK OFFICE

CERTIFICATE OF CORRECTION

PATENT NO. : 6,074,756
DATED : June 13, 2000
INVENTOR(S) : William B. Vreeland, et al.

It is certified that error appears in the above-identified patent and that said Letters Patent is hereby corrected as shown below:

This certificate supercedes certificate of correction issued May 22, 2001, the number was erroneously mentioned and should be deleted since no certificate of correction was granted.

Signed and Sealed this

Thirtieth Day of October, 2001

Attest:

Nicholas P. Godici

NICHOLAS P. GODICI

*Attesting Officer*

*Acting Director of the United States Patent and Trademark Office*